United States Patent [19]

Böhm et al.

[11] Patent Number: 4,485,407

[45] Date of Patent: Nov. 27, 1984

[54] TELEVISION CAMERA FOR INDOOR AND OUTDOOR USE

[75] Inventors: Friedrich Böhm, Nuremberg; Richard Sebald, Wiesental, both of Fed. Rep. of Germany

[73] Assignee: Grundig E. M.V., Fuerth, Fed. Rep. of Germany

[21] Appl. No.: 438,473

[22] Filed: Nov. 2, 1982

[30] Foreign Application Priority Data

Nov. 7, 1981 [DE] Fed. Rep. of Germany ....... 3144275

[51] Int. Cl.³ .......................... H04N 5/26; H04N 7/18
[52] U.S. Cl. ...................................... 358/229; 361/391
[58] Field of Search ................. 358/229, 99, 108, 209, 358/217; 361/380, 384, 390, 391, 422; 352/242; 354/64, 288; 455/347, 348, 349

[56] References Cited

U.S. PATENT DOCUMENTS 4,394,692 7/1983 Randmae ........................... 358/229
4,414,576 11/1983 Randmae ........................... 358/229

*Primary Examiner*—Howard W. Britton
*Attorney, Agent, or Firm*—Kane, Dalsimer, Kane, Sullivan & Kurucz

[57] ABSTRACT

A compact television camera readily convertable between indoor and outdoor use having a housing frame with front and rear face and lateral side opening to allow access to the frame's interior upon removal of housing lids placed thereover. The front face includes a mounting unit adapted to be coupled with an indoor or outdoor camera lens of which an outdoor lens with a front heating unit is illustrated. The rear face is provided with an opening to allow plug in of a power source etc., and a mounting device is provided which allows removal and remounting of the camera without problems. In addition, circuit boards are utilized for engagement with the camera elements while so positioned to allow ready access to the cameras interior for conversion, servicing and/or replacement of parts.

14 Claims, 6 Drawing Figures

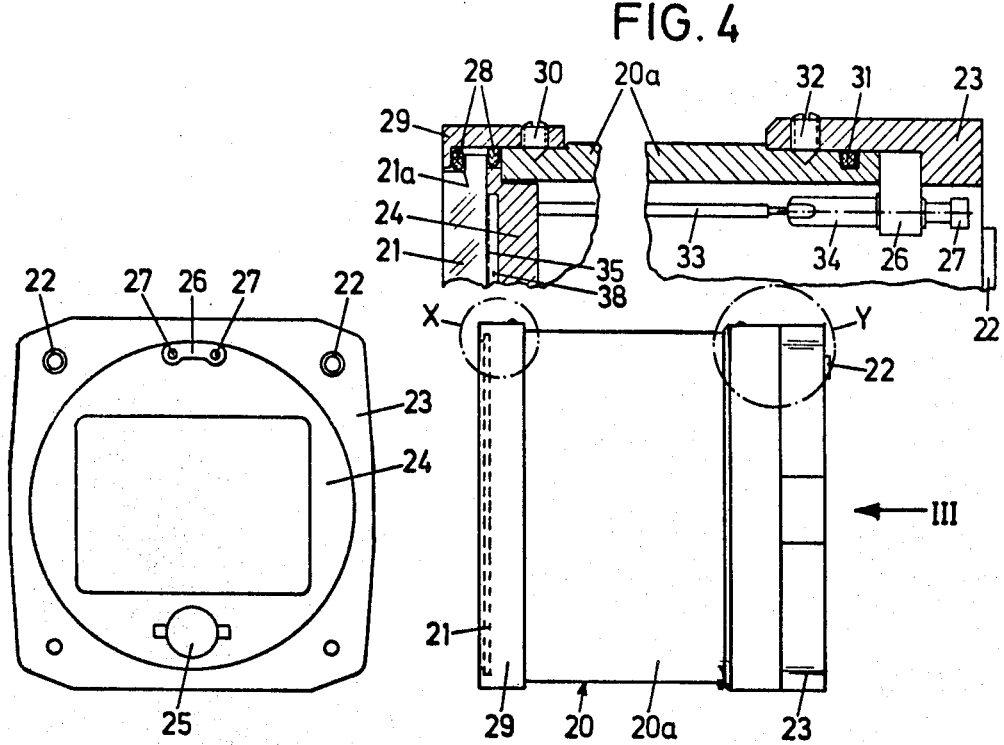
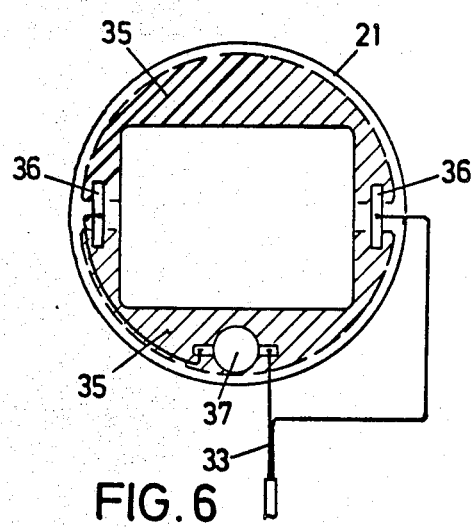
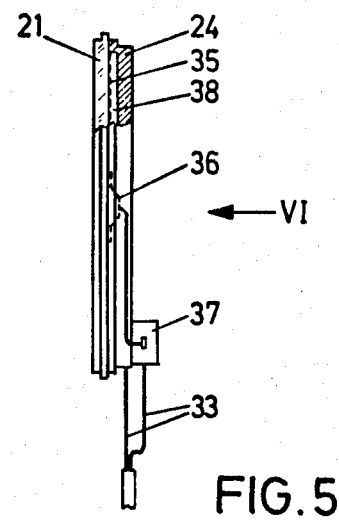

TELEVISION CAMERA FOR INDOOR AND OUTDOOR USE

FIELD OF THE INVENTION

The present invention relates to a television camera, particularly one that is compact and changeable between indoor and outdoor use.

BACKGROUND OF THE INVENTION

Television cameras, particularly the compacted type, have had increased applications for control and security purposes, often being used in both indoor and outdoor settings. In the latter type of situation, the camera must be protected from the elements and be of a weatherproof design.

While compact television cameras are presently available and used in a wide range of applications (see for example the television camera Model No. FA 70 manufactured by Grundig, E.M.V., Elektro-Mechanische, Versuchsanstalt, Max Grundig, Kurgartenstrasse, 8510 Fuerth/Bay., West Germany) they are principally for indoor and outdoor use.

If outdoor use is intended, a means of protecting the camera from the elements must be provided. In this regard, consideration must be had of the manner in which a compact television camera may be converted between indoor and outdoor use. In a presently known compact television camera, for example that manufactured by Grundig E. M. V., aforenoted, Model FA 70H, there is provided a light metal die case frame, formed by a bottom, front and rear walls as well as a cover lid.

Another type of camera that is presently available includes the features of a pivotable printed circuit board in the camera such as that manufactured by Robert Bosch. GmbH, Fernsehanlagen, Robert-Bosch-Strabe 7, 6100 Darmstadt under Model No. T YK 9A. Unfortunately however, the housing structure of this camera is such that the housing must be removed or dismantled in the case of servicing which is inconvenient, time consuming and adds to the expense involved.

While there does presently exist cameras which offer protection in some fashion against the elements, their use is rather specific and not readily convertible between indoor and outdoor use. Further, some known compact cameras could be mounted suspending or in normal position. If the camera is mounted upside down the deflection must be changed for 180° and heat problems occur due to this mounting. Accordingly, there exists a need for a compact camera which is adaptable for outdoor as well as indoor use, and yet relatively simple and inexpensive and avoid the disadvantages aforenoted.

SUMMARY OF THE INVENTION

It is a principal object of the invention to provide for a compact camera which is readily adaptable for outdoor or indoor use, in an effective manner which is relatively simple and inexpensive.

It is a further object of the invention to provide for a camera which does not suffer from deflection or overheating as heretofore realized.

A yet further object of the invention is to provide a camera which is easily detached from its mounting and readily serviceable without always requiring disassembly of the entire camera housing.

The present invention provides for a compact television camera for inside or outside which allows for a simple change over therebetween. A plug in housing is provided which allows for readily coupling to a power source along with a lens receptacle which provides for interchangeability of lenses.

The housing frame is coupled to two lateral housing lids which together with housing frame form the camera housing. The front face of the housing frame is provided with an insulated unit for interchangeably mounting the lens tube, lens support and preamplifier. A dove tail guide forms the mount for mounting the camera housing frame to the desired surface.

Contained in the housing frame are flexible printed circuit boards including ones mounted on the lateral sides of the housing frame readily accessible for servicing or replacement upon removal of the lids, along with a means for providing heat deflection from the electrical parts of the camera. An outdoor lens is illustrated for coupling to the lens support of the frame and includes front window heating.

The present invention's compact television camera provides for a relatively inexpensive and effective camera housing, manufacture as well as servicing wise. It converts an indoor camera into a manageable weatherproof television camera by a simple changeover facilitated by a plug in housing and attachable lens tube. Even when using heavy lenses, no twisting of the housing structure occurs due to its construction.

Further advantageous features of the present invention's compact television camera are the simple and favorable type of mounting for stationary or suspended mounting, as well as a favorable arrangement for camera elements, in particular the heat sensitive structural parts. Further, due to the versatile lens mounting, in outdoor use where a front lens heater is desired, upon removal of the lens from the housing the front window heater is automatically interrupted and is automatically re-established when re-attached.

BRIEF DESCRIPTION OF THE DRAWINGS

Thus by the present invention, its objects and advantages will be realized, the description of which should be taken in conjunction with the drawings wherein:

FIG. 2 is a side view of the lens tube for detachably coupling to the front face of the compact camera, incorporating the teachings of the present invention;

FIG. 3 is an axial view of the lens tube shown in FIG. 2 taken in the direction of III;

FIG. 4 is an enlarged partially sectional view of the lens tube shown in FIG. 2;

FIG. 5 is a partial cross-sectional view of the front window heater in the lens tube shown in FIG. 2; and FIG. 6 is an axial view of the front window heater shown in FIG. 5 taken in the direction of VI.

DETAILED DESCRIPTION OF THE PREFERRED EMBODIMENT

Figure 1:
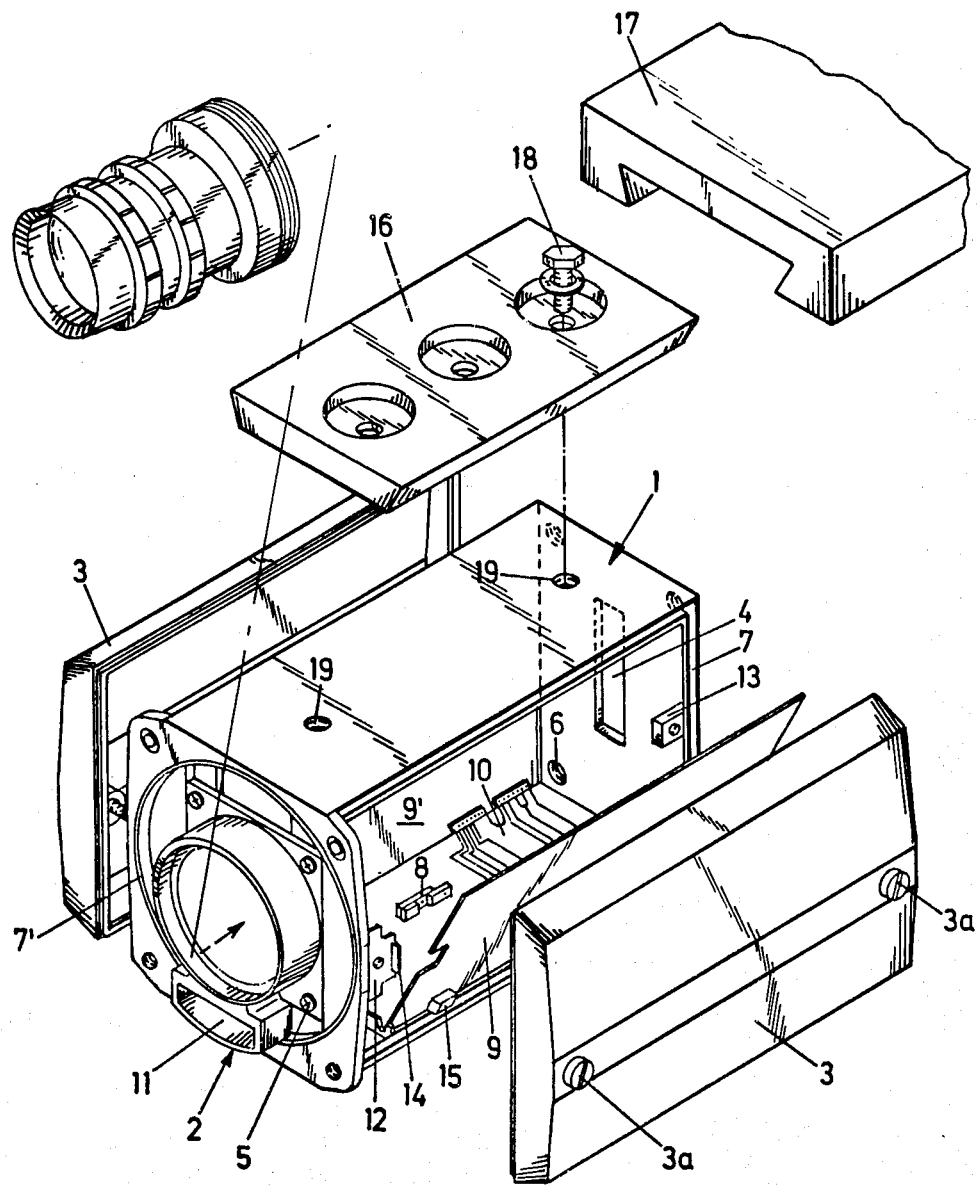
FIG. 1 is a partially exploded view of the compact camera (with the camera lens shown in phantom) incorporating the teachings of the present invention.

Turning now more particularly to the drawings, in FIG. 1 there is shown an exploded, partially phantom view of a compact television camera housing and lens. The housing is provided with a yoke or housing frame 1 which may be made of perhaps an aluminum die cast and forms the supporting part of the housing and prevents its twisting, even when mounting very heavy lenses. A structural or mounting unit 2 is provided for the video pick up lens tube mounting and that of the preamplifier, as described in detail for example in West German Patent Application No. P 31 43 058.9 commonly assigned to assignee here. The structural unit 2 is composed of deflection as well as centering unit, yoke support, mounting flange, and a preamplifier and a lens support plate. This unit 2 is mounted to be electrically insulated from the front face of the housing frame 1 via four screws 5 and would be provided with appropriate electrical contacts for connection with the lens being attached or camera elements (not shown) being inserted within the housing frame 1.

Respective housing lids 3 are provided on the opposite longitudinal sides of the housing frame 1 and are removably fastened thereto via captive screws 3a, rotatably maintained on the lids 3.

The housing frame 1 may be coupled to a power supply or additional devices via opening 4 by using a standard plug in bar and mounted by way of threaded openings 6 in the rear side of the housing frame 1. Note that the required protection (i.e., IP 66 in accordance with DIN 40050) necessary in weatherproof designed compact television cameras is provided by the O-ring gaskets 7 disposed about the inside perimeter of the housing lids 3, the plug-in bar opening, and the lens tube arrangement as hereinafter described.

In addition, the operation safety of the compact television camera at high temperatures (i.e., +55° C. ambient temperature) is obtained by the favorable arrangement of heat sensitive structural elements in housing frame 1. For example, shoulder 8 is provided on the housing bottom for mounting of power transistors which are to be cooled.

Respective printed circuit boards 9 and 9' are pivotably mounted on the two longitudinal sides of the housing frame 1 making the servicing thereof readily accomplished by the removal of lids 3. These two printed circuit boards 9 and 9' may be, for example, an amplifier plate and a pulse plate respectively, which may be connected together by means of a flexible printed circuit board 10. A shielded preamplifier plate (not shown) in an opening of the mounting flange may also be provided and may be plugably connected to the amplifier plate 9 by means of a connecting cable, or the like.

Snap hooks 14 are provided on shoulders 12 and 13 for supporting the respective printed circuit boards thereon. The printed circuit boards 9 and 9' can readily be pivoted away from the housing frame 1 by slightly pushing on the snap hooks 14 outwardly biasing them. An abutment 15 on the printed circuit boards serves to limit the pivot range of the boards.

The inner structure of the compact television camera is completely free in such an arrangement. In addition, the structural parts of the camera are prevented contact with the electrical parts.

Note that upon separation of the plug-in connections between the flexible printed circuit board 10 and the two "larger" printed circuit boards 9 and 9' (which may be provided for additional fixable modules plug-in connections) allows for an immediate printed circuit board exchange, if necessary without dismantling the entire camera.

Accordingly, servicing of the compact camera would not necessarily require its removal from a fixed mounting if such is the case. Access to the cameras housing merely requires the loosening of the two screws 3a of each housing lid 3. Removal of the lids 3 expose electrical and electronic structural parts rendering them freely accessible. Due to the housing structure, the wiring, and disposition of the electric structural parts all adjustment and servicing operations can be simply performed at the locality.

A dove tail guide comprising dove tail member or base 16 with an associated guide plate 17 is provided for the mounting of the camera. Member 16 is coupled to the housing frame 1 by means of screw 18 which are screwed down into threaded bores 19 in housing frame 1 via openings in base 16. The coupling of member 16 to the housing frame is done in a twist proof manner and accordingly should be adjusted to the center of gravity of the camera.

Note that the guide plate 17 may be fixedly attached to a structural etc., at the angle desired. The camera housing frame 1 can then be slid into the guide plate 17 to mount the camera thereon. Since the guide plate 17 remains fixed the desired angle, the deflection of camera remains the same eliminating the usual necessity of electrical adjustment. Furthermore, this would allow for easy replacement, service and interchangeability of cameras having comparable dove tail guides. The guide plate 17 may be mounted or suspended from a ceiling or resting on a surface, etc. Furthermore, this fixed type of mounting on a ceiling also precludes any additional heat problems which is a consideration in upside down mounted cameras.

As part of the weatherproof design, a lens tube with a front window and a front window heater are provided for coupling to the camera housing and reference in this regard is made particularly to FIGS. 2-6. In FIG. 2 a side view of a lens tube 20 which may be coupled with the camera, if so desired.

Arrow III in FIG. 2 indicates the view taken of lens tube 20 from inside of the camera to the front window 21 and is depicted in FIG. 3. The attachment position of the lens tube 20 intended to be coupled to the housing frame 1 includes eyes 22 on flange 23. The opposite end of the lens tube 20 or its tube 20a is gripped by a coupling ring 29. In addition to flange 23 and the eyes 22, a circular face with a rectangular cut out in the center is shown in FIG. 3. This face includes a contact support 24 as a part of front window heater which is described hereinafter in conjunction with the discussion as to FIGS. 4 to 6. Note that the heater arrangement is similar to that disclosed in U.S. patent application Ser. No. 143,930 entitled "Device for Heating the Front Lens of a Television Camera" filed Apr. 24, 1980, allowed Nov. 10, 1981, now U.S. Pat. No. 4,355,861, the disclosure of which is incorporated herein by reference.

The rectangular cut out in the contact support 24 has a side ratio of 3:4 which corresponds to that standardly used in television camera operation. In addition, a recess 25 for a thermostat is provided in contact support 24. A contact pin insert 26 with spring contacts 27 is clamped between flange 23 and tube 20a as can be seen most clearly in FIG. 4 whereby it is disposed and maintained in a recess in the flange 23, which may be formed out of die cast aluminum.

The eyes 22 on flange 23 define the position of the lens tube to be aligned with the mounting unit 2 providing for the uniform coupling and alignment of the front window 21, and the spring contacts 27 for the power supply to the front window heating.

With reference more particularly to FIG. 4, there is shown an enlarged detail view of the portion of the lens tube indicated as areas X and Y in FIG. 2. The front window 21 enlarged at X in FIG. 4 is shown positioned between two O-ring gaskets 28. The front window 21 and the contact support 24 are maintained on the tube 20a, by way of the mounted coupling ring 29 and associated screws 30. The O-ring gaskets 28 serve for sealing and insulation of heat conductive metal parts, so that the least amount of heat is drawn off from the front window 21. The groove 21a on the front window 21 is desirable so that the edge of the coupling ring 29 forms a flush plane with the front window 21 when using window wipers.

In the enlarged portion at Y in FIG. 4, the contact pin insert 26 is shown in conjunction with the spring contact(s) 27 and is inserted in a recess in flange 23. The tube 20a is provided with an O-ring gasket 31 in contact with flange 23. Upon tightening of the (two) screws 32 in flange 23, it holds the contact pin insert 26 in its position.

Accordingly, due to the simple plug-in and fixing of the contact pin insert 26 as well as the exact attachment position of the tube 20 due to eyes 22, results in a very simple tube mounting. The lens tube 20 (for example, providing protection IP 66 in accordance with DIN 40050) is mounted on the compact television camera and fastened on the housing frame 1 with (four) captive screws (not shown). The O-ring gasket 7 on housing frame 1 seals the connecting surfaces in accordance with IP 66. The length of the tube can be adjusted for the lens, whereby merely the exchange of the tube 20a is required. When removing the lens tube 20 from the compact television camera, the front window heater is interrupted by separating the contact face (spring contacts 27); during reattachment the contact is again reestablished.

The connecting cable 33 of the front window heater may be pushed into engagement with connecting pins of the spring contacts 27 by means of plug sockets 34 and therefore also provides for simple mounting and maintenance.

More particularly with regard to FIG. 5, there is shown a cross section of the front window heater which may be used in the compact television camera disclosed herein. FIG. 6 shows a plan view of this front window heater in the direction of view of arrow VI in FIG. 5 with however the contact support 24 omitted. The heater includes two segment like heating layers 35 vapor deposited on the inside of the perimeter of the front window 21 and are formed as illustration in a side ratio of 3:4.

The power supply from the connecting cable 33 to the heat layer is established with contact springs 36 maintained on or in contact support 24. A thermostat 37 (embedded in recess 25 of the contact support 24) controls the heating period. This thermostat control for the front window 21 will switch on at +24° C., so that there is no danger that a dew formation occurs on front window 21 during assembly at normal temperature (+23° C., relative dampness 50%).

The heat layers 35 of the compact television camera are switched parallel, which enables to double the resistance required. Also, due to present evaporation depositing technology, the durability of the evaporated deposited layer suffers when the layer thickness is otherwise made thicker for reducing the resistance.

The contact support 24, preferably made of plastic, is so designed that the heat radiated from the heat layer 35 is insulated from the lens tube 20. Also, the direct heat transmission between heat layer 35 and the contact support 24 is prevented, due to an air buffer 38 therebetween. This assures that the largest part of the generated heat affects the front window.

The power supply of the compact camera would be designed such that in the necessity of a weatherproof design the window heating is operable without an extra power supply.

As can be seen, this front window heater can be mounted in lens tubes for compact television cameras without any technical difficulty. The direct front window heater set forth allows for full use of the compact television camera over a wide range i.e., down to −35° C. ambient temperature and prevents an ice formation on front window 21, and at the opposite end of the spectrum, the camera effectively operates up to +55° C. ambient temperature in view of the positioning of the heat sensitive structural elements in housing frame 1, as aforenoted.

Furthermore, by the solid construction of the compact television camera (i.e., cast die aluminum parts) in conjunction with the dimensioning of the indoor camera housing results in providing a means for a manageable weatherproof compact television camera readily changeable, providing plug-in housing and screwless lens tube, as herein described.

Thus by the present invention, its objects, advantages and others are readily realized and although a preferred embodiment has been disclosed and described in detail herein, its scope should not be limited thereby, rather its scope should be determined by that of the appended claims.

What is claimed is:

1. A television camera adaptable to be connectable between indoor and outdoor use, comprising:
   housing frame means having a generally rectangular box configuration at least two lateral sides with openings therein and front and rear face, at least two housing lid means removably coupled to respective longitudinal sides over said openings and capable of creating a seal thereabout preventing undesired ingress or egress through said openings;
   front face mounting unit coupled to said front face and capable of supporting and mounting a camera lens thereon;
   guide means including base and guide means, the base being fixedly coupled to the top or bottom side of said housing frame means with the other adapted to be fixedly attached to a surface, said guide and base having cooperating surfaces which allow for releasably coupling of the guide and base and accordingly the camera to a surface; and
   circuit board means supported by the housing frame and readily accessible upon removal of a housing lid means.

2. The camera in accordance with claim 1 which includes respective gaskets engageable between the housing frame means about said openings and the respective lid means so as to create a seal about said openings.

3. The television camera in accordance with claim 2 which includes first circuit board means disposed along a first longitudinal side of said housing frame and second circuit board means supported along a second longitudinal side of said housing frame, said first and second circuit board means pivotably connected together, one of said circuit board means being pivotable away from said housing frame upon removal of a lid means.

4. The television camera in accordance with claim 3 wherein said lid means are disposed on opposite longitudinal sides of said housing frame means covering said openings, a third circuit board means pivotably connected to the first circuit board means and disposed along a third longitudinal side of said housing frame, two of said circuit board means being pivotably away from said housing frame means upon removal of both lid means.

5. The camera in accordance with claim 4 wherein said frame means includes respective mounting shoulders adjacent said respective openings with said lid means detachably coupled thereto, and said shoulders being adapted to support the respective circuit board means positioned along two lateral sides of the frame means.

6. The camera in accordance with claim 1 which includes an opening in the rear face adapted to allow access therethrough and accordingly access to the interior of the housing and mounting means on said rear face adapted to facilitate the mounting of a connection therewith.

7. The camera in accordance with claim 1 wherein said housing frame means includes a closed lateral side constituting a bottom portion thereof, and a shoulder means mounted on the bottom portion for heat deflecting mounting of electrical parts of the camera.

8. The camera in accordance with claim 1 which further includes a lens comprising a hollow cylindrical lens tube having at one of its ends a mounting means adapted to be detachably coupled to the front face mounting unit, front window positioned at said lens tube opposite end and heating unit operationally coupled to said front window to effect the heating thereof according to a predetermined criteria.

9. The camera in accordance with claim 8 wherein said mounting means is a mounting flange, a contact pin insert adjacent said flange having at least one spring contact pin adapted to engage said mounting unit to establish an electrical connection therebetween, said front window including segment like vapor deposited heater layer over a portion thereof, means coupling said heater layers to said contact pin, contact support means positioned rearward from said front window forming a space between said heater layer and said support means and means forming a seal between said front window and the lens tube.

10. The camera in accordance with claim 9 wherein the contact pin insert is positioned in a recess of said flange and being fixed therein by means of said lens tube, and said lens tube forms a seal between said lens tube and said flange.

11. The camera in accordance with claim 9 wherein said heating unit includes a thermostat supported by the contact support means and capable of regulating the necessary amount of heat.

12. The camera in accordance with claim 11 wherein said connecting means includes a cable coupled to said heater layer by contact springs at one end and coupled to said contact pin at its other end.

13. The camera in accordance with claim 9 wherein said mounting flange includes centering means facilitating the centering of the lens tube on the front face mounting unit.

14. The camera in accordance with claim 1 wherein said guide means includes a dove tail guide and said base includes cooperating surface to accommodate said dove tail guide so as to allow a sliding relationship of said guide within said base while supporting said television camera.

* * * * *

UNITED STATES PATENT AND TRADEMARK OFFICE
CERTIFICATE OF CORRECTION

PATENT NO. : 4,485,407
DATED : November 27, 1984
INVENTOR(S) : Böhm et al.

It is certified that error appears in the above-identified patent and that said Letters Patent is hereby corrected as shown below:

IN THE ABSTRACT

Line 14, "cameras" should be --camera's--.

Col. 3, Line 65, "cameras" should be --camera's--.

Col. 6, Line 32, "connectable" should be --converted--;

Line 35, after "configuration" insert --comprising--;

Col. 7, Line 5, "pivotably" should be --pivotable.

Signed and Sealed this

Twenty-third Day of July 1985

[SEAL]

Attest:

DONALD J. QUIGG

Attesting Officer     Acting Commissioner of Patents and Trademarks